(12) United States Patent
Zientek

(10) Patent No.: US 6,372,394 B1
(45) Date of Patent: Apr. 16, 2002

(54) LASER MARKING OF ARTICLES

(75) Inventor: Paul Zientek, North Carlton (AU)

(73) Assignee: Securency Pty Ltd, Craigieburn (AU)

( * ) Notice: Subject to any disclaimer, the term of this patent is extended or adjusted under 35 U.S.C. 154(b) by 0 days.

(21) Appl. No.: 09/367,480

(22) PCT Filed: Feb. 19, 1998

(86) PCT No.: PCT/AU98/00104

§ 371 Date: Sep. 17, 1999

§ 102(e) Date: Sep. 17, 1999

(87) PCT Pub. No.: WO98/36913

PCT Pub. Date: Aug. 27, 1998

(30) Foreign Application Priority Data

Feb. 20, 1997 (AU) .............................................. PO5239

(51) Int. Cl.[7] .............................. B41M 5/24; B41J 2/435
(52) U.S. Cl. ........................ 430/10; 430/15; 430/346; 430/945; 283/85
(58) Field of Search ............................. 430/10, 15, 17, 430/18, 346, 945; 283/85; 219/121.85

(56) References Cited

U.S. PATENT DOCUMENTS

| | | | |
|---|---|---|---|
| 5,005,872 A | 4/1991 | Lass et al. | |
| 5,122,813 A | 6/1992 | Lass et al. | |
| 5,330,876 A | 7/1994 | Kaszczuk et al. | |
| 5,376,314 A | * 12/1994 | Share et al. | ................. 264/25 |
| 5,387,496 A | 2/1995 | DeBoer | |
| 5,429,909 A | 7/1995 | Kaszuzuk et al. | |
| 5,468,591 A | 11/1995 | Pearce et al. | |
| 5,574,493 A | 11/1996 | Sanger et al. | |
| 5,576,141 A | 11/1996 | Neumann et al. | |
| 5,576,142 A | 11/1996 | Neumann et al. | |
| 5,959,768 A | * 9/1999 | Hutton | ........................ 359/359 |

FOREIGN PATENT DOCUMENTS

| | | |
|---|---|---|
| AU | 87665/82 | 4/1983 |
| AU | 41783/93 | 1/1994 |
| AU | 41784/93 | 1/1994 |
| EP | 0 564 877 A1 | 10/1993 |
| EP | 636490 | 2/1995 |
| EP | 636493 | 2/1995 |
| WO | WO 83/00659 | 3/1983 |
| WO | 98/03348 | 1/1998 |

* cited by examiner

*Primary Examiner*—John A. McPherson
(74) *Attorney, Agent, or Firm*—Christensen O'Connor Johnson & Kindness PLLC

(57) ABSTRACT

A method of marking or forming a transparent window in an article 6, such as a security document, is provided in which areas of opacifying layers of printed ink 8, 10 on opposite surfaces of a polymeric film or substrate 12 are irradiated by laser radiation 4 of a selected wavelength. The opacifying layers 8, 10 have greater absorption characteristics for the laser radiation than the film or substrate 12 which is substantially transparent to the selected wavelength of the laser radiation so that after ablation of the area of printed matter 8 on one surface, the radiation passes through the substrate 12 substantially unaffected to ablate the area of printed matter 10 on the opposite surface. In the resultant article, the markings or windows formed by the areas of printing removed from each surface of the substrate 12 are in register, and provide a deterrent against counterfeiting.

38 Claims, 3 Drawing Sheets

(a)

(b)

(c)

LASER MARKING OF ARTICLES

Figure 1:
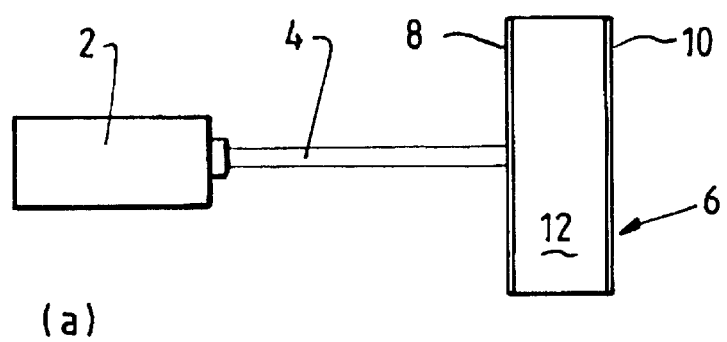
Figure 1:
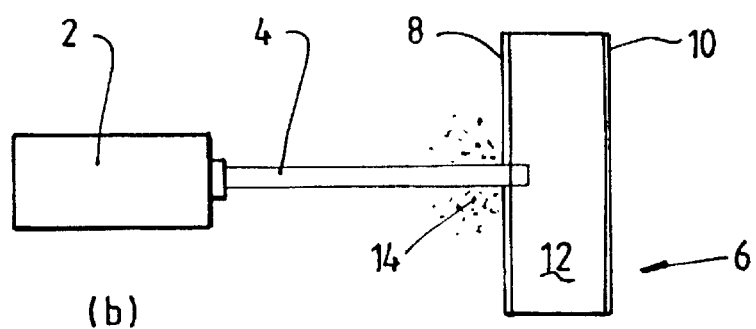
Figure 1:
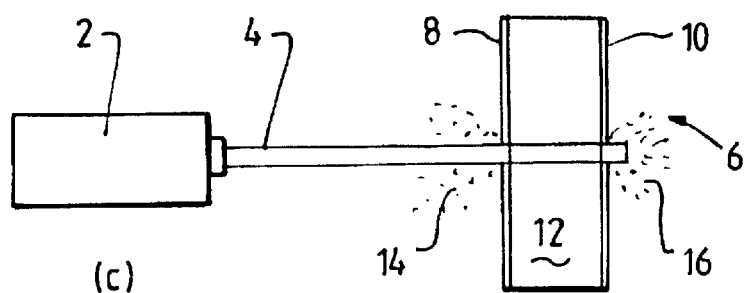

This is a U.S. national stage application of International application No. PCT/AU98/00104, filed Feb. 19, 1998, the benefit of the filing date of which is hereby claimed under 35 U.S.C. § 120, which in turn claims the benefit of Australian application No. PO 5239, filed Feb. 20, 1997, the benefit of the filing date of which is hereby claimed under 35 U.S.C. § 119.

The present invention relates to a method of marking articles by a laser and more particularly to a method of marking security documents or other documents having a clear substrate covered by opacifying layers, such as printed matter.

Previously known are methods for marking glass or plastic materials using a laser. A high energy laser beam is made to converge at a plane underneath the surface of the material to form an opaque region through ionisation of the material at the point of convergence. In another known arrangement, marking of plastic objects by a coloured laser is performed by exposing a lacquered film, which is applied to the surface of the object, to laser radiation. The film, containing at least one colour component, softens at the irradiated areas and the colouring component penetrates the surface and the non-irradiated areas of the film are dissolved by a suitable solvent to leave a darker impression where the markings are located. Also known are security papers, such as banknotes, cheques and identity cards that have luminescent authenticity marks made with substances that luminesce only in the visible spectrum.

The surfaces of laser-sensitive plastics, such as polyvinyl chloride (PVC), have been marked by causing a colour change in the irradiated area of the surface. Where a particular plastic is not laser-sensitive, such as polypropylene (PP), polyethylene (PE) or polyethyltetraphthalate (PET), it can be made laser-sensitive by incorporating a laser-sensitive additive into the plastic.

Yet another arrangement discloses a lithographic printing plate, imageable by laser, which has a first layer and a substrate layer underneath the first layer. The substrate has efficient absorption characteristics of infra red laser radiation, the first layer and substrate layer each having different affinities for ink (in a dry-plate construction) or an adhesive fluid for ink (in a wet-plate construction). When irradiated by the laser, the substrate absorbs the radiation and ablation occurs at the surface of the substrate which is in contact with the first layer. This leads to loosening of the substrate overlying the first layer which is then removed at the point of exposure. The result of the removal is an image spot whose affinity for the ink or ink-abhesive fluid differs from that of the unexposed first layer leading to a permanent marking.

Whilst the methods of marking articles described above are useful for marking one side or surface of an article, if it is desired to mark opposite sides or surfaces of an article, two separate laser marking operations are required. It is therefore desirable to provide a simple and effective method of marking opposite surfaces of an article, such as a security document.

It is also desirable to provide a convenient method of forming a transparent window in an article such as a security document.

According to one aspect of the present invention there is provided a method of marking an article, the article comprising a substrate with opacifying layers on opposite surfaces of the substrate, said method comprising:

irradiating an area of the opacifying layer on one surface of the substrate with laser radiation such that said area of the opacifying layer on said one surface is ablated by the laser radiation to produce a marking by removing said area of the opacifying layer on said one surface, wherein the laser radiation travels through the substrate and ablates an area of the opacifying layer on the opposite surface of the substrate to produce a marking by removing the area of the opacifying layer from the opposite surface of the substrate.

The present invention also provides a method of creating a transparent window in an article comprising a clear substrate with opacifying layers on opposite surface of the substrate, said method comprising:

irradiating an area of the opacifying layer on one surface of the substrate with laser radiation such that said area is ablated by the laser radiation to remove said area of the opacifying layer from said one surface, wherein the laser radiation travels through the substrate and ablates an area of the opacifying layer on the opposite surface of the substrate to create a transparent window in the substrate.

Preferably, the opacifying layers on opposite surface of the substrate have greater absorption characteristics for laser radiation than the substrate. Preferably the wavelength of the laser radiation is selected such that when the article is exposed to radiation the opacifying layers absorb the radiation and are ablated from the substrate, the substrate being substantially transparent to the radiation at that selected wavelength so that the laser radiation travels through the substrate substantially unimpeded.

The laser radiation may be a continuous beam. Alternatively, it may be emitted as a pulse or series of pulses.

The present invention also provides an article comprising a substrate having opacifying layers on opposite surfaces of the substrate, the substrate being formed from a material which is substantially transparent to laser radiation of a selected wavelength, wherein each of said surfaces has a marking formed therein, said markings being formed by removing a first area of the opacifying layer on one surface of the substrate by ablating said first area with laser radiation of the selected wavelength, and allowing the laser radiation to pass through the substrate to remove an area of the opacifying layer on the other surface in register with said first area removed from the opacifying layer on said one surface.

This invention generally relates to printed articles, such as banknotes or currency, security documents or any other document having printed matter arranged thereon, that have a clear substrate with opacifying layers of printed ink on opposite surfaces of the substrate on at least a portion of the article. Laser radiation may be used to create a clear or transparent area, in the shape of a particular design or character or symbol, in the portion of the article where there are printed ink layers on one or both sides of the clear base substrate. It does this by removing or ablating the printed ink layers from either or both sides of the substrate in the appropriate areas of the article.

A certain relationship must exist between the wavelength of the laser light used and the relative absorption characteristics of the clear substrate and the layers of printed matter at the selected wavelength. For example, the layers of printed matter should be good absorbers of the laser radiation so that the layers can be removed or ablated when exposed to the radiation for a predetermined period. Also, the clear substrate should be a poor absorber of laser radiation when compared to the absorption characteristics of the printed layers at the selected wavelength. The substrate should be substantially transparent to the radiation at this wavelength, allowing light at the selected wavelength to travel through the substrate without creating substantial damage or distortion to the clear substrate. In this way, a transparent window is formed with both surfaces of the substrate being in register according to the desired shape, symbol, design or character at the places of exposure to the radiation.

The present invention is particularly, but not exclusively, applicable to banknotes or other security documents having at least a portion of the document formed from a clear plastics substrate having at least one opacifying layer of ink on both of its surfaces. The clear plastics substrate is preferably formed of a transparent polymeric material, such as PE, PP or PET, which may be made up of at least one biaxially oriented polymeric film. The substrate may comprise a single layer film of polymeric material. Alternatively, the substrate may comprise a laminate of two or more layers of transparent bi-axially-oriented polymeric film of the type described in Australian Patent No. AU-A-87665/82, the contents of which are incorporated herein by reference.

The opacifying layers of printed matter may comprise any one or more of a variety of opacifying inks which can be used in the printing of banknotes or other security documents. For example, the layers of opacifying ink may comprise pigmented coatings comprising a pigment, such as titanium dioxide, dispersed within a binder or carrier of cross-linkable polymeric material as described in Australian Patent Specification No. AU-A-87665/82.

Preferably, the selected wavelength of the laser radiation falls substantially within the range from about 0.5 microns to about 20 microns.

In a particularly preferred embodiment, the clear plastics substrate is formed of PP, the layers of opacifying ink are formed of $TiO_2$ and silica dispersed within a polyurethane based resin, and the wavelength of the laser radiation used is either approximately 1.06 microns or approximately 10.6 microns.

Preferred embodiments of the invention will now be described, by way of example only, with reference to the accompanying drawings, wherein:

FIGS. 1(a), (b) and (c) show a continuous laser beam acting on an article and ablating printed matter from surfaces of the article;

FIGS. 2(a), (b) and (c) show a laser emitting a single pulse of radiation and acting on an article to ablate printed matter from surfaces of the article; and FIGS. 3(a), (b), (c) and (d) show a laser emitting a series of pulses of radiation acting on an article to ablate printed matter from surfaces of the article.

Referring to FIG. 1 there is illustrated an ablation process on an article using a continuous wave laser system. A laser source 2 emits a continuous beam 4 of laser light that impinges on and acts on one side of an article 6. The article 6 has a first layer 8 comprising printed ink matter, a second layer 10 also comprising printed ink matter and a clear substrate in the form of a polymeric film 12 between layers 8 and 10. As shown in FIG. 1(a) the beam 4 initially contacts first layer 8 leading to localised heat build-up in the layer due to the absorption of radiation by the layer 8 as shown in FIG. 1(b). Eventually the internal bonds and cohesive forces of the layer structure weaken and break down leading to ablation or removal of particles 14 of layer 8. At this stage, the laser beam 4 has penetrated the first layer 8 and travels through the film 12 substantially unimpeded until it impinges on the surface of layer 10 located on the other side of film 12. Little or no absorption of the radiation takes place while the beam 4 travels through film 12 and hence little or no heat build-up and consequential damage to the film occurs. The difference in absorption characteristics between the layers 8 and 10 and the film 12 is relative and therefore there may be some heat build-up in the film. The laser beam 4 should therefore only be exposed to the article 6 for a period of time sufficient not to cause appreciable damage or distortion to the film 12. The relative absorption characteristics of the layers 8 and 10 and the film 12 and the power output from the laser source 2 should be chosen so as to provide the necessary ablation of the layers resulting in a transparent window. As shown in FIG. 1(c), when the laser beam 4 impinges on the second layer 10 a similar ablation process occurs whereby particles 16 are removed from the surface thereof as with layer 8. This leaves a clear or transparent area which is in register on both surfaces of the film 12 in the shape of the desired design or symbol, etc.

Figure 2:
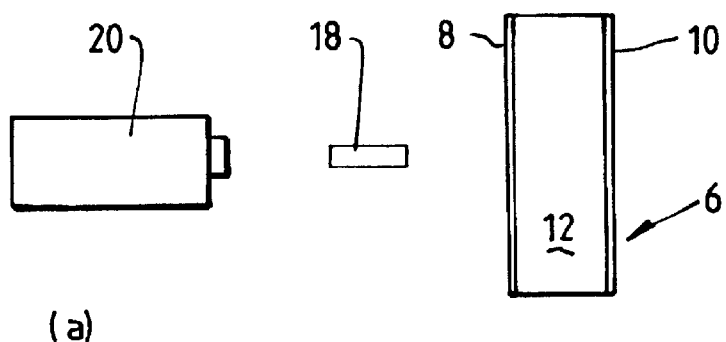
Figure 2:
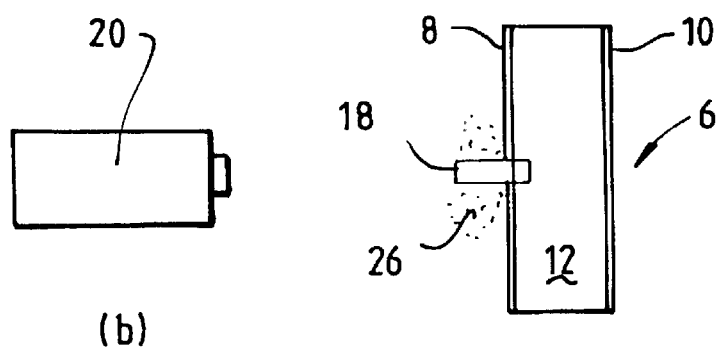
Figure 2:
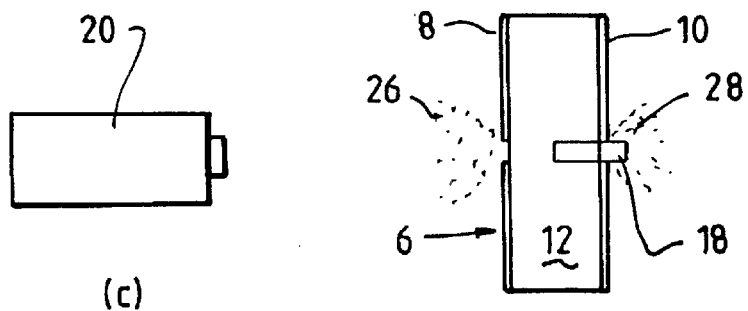

In FIG. 2 there is depicted an ablation process on an article using a pulsed laser source 20 in which a single pulse 18 of radiation as shown in FIG. 2(a) is emitted from laser source 20 to impinge on the article 6 from one side. As shown in FIG. 2(b) the laser pulse 18 has enough energy to break through and ablate the surface of first layer 28 resulting in particles 26 of the layer being dislodged in the same fashion with respect to the process of FIG. 1. The pulse 18, with its remaining energy continues to travel through film 12 with little or no absorption of the radiation, and therefore little or no heat build-up and subsequent damage to the film, until it impinges on the second layer 10 of printed material. Provided the pulse possesses enough energy, a similar ablation process to layer 20 occurs in which particles 28 are removed from the surface of layer 22 as shown in FIG. 2(c). A transparent window results in which the areas of the ablations of layers 8 and 10 forming the desired character, symbol or design in both surfaces of the film 12 are in register.

Figure 3:
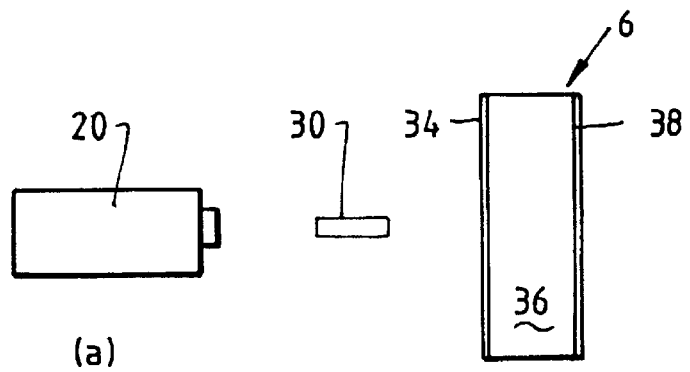
Figure 3:
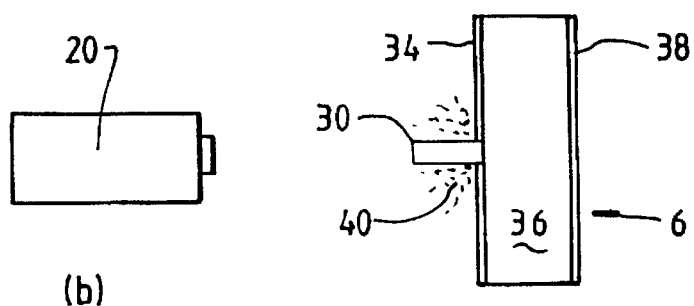
Figure 3:
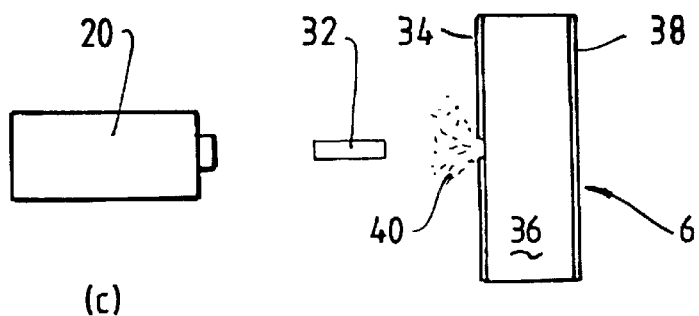
Figure 3:
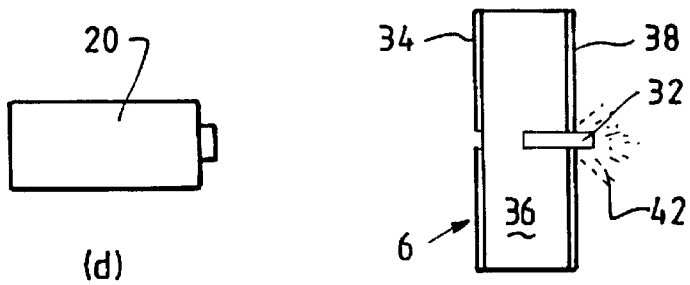

If the power of the laser using a single pulse is not sufficient to ablate the layers of printed matter completely, then more than one pulse or a series of pulses may be used, as depicted in FIG. 3. These multiple and consecutive pulses are emitted from pulsed laser source 20. The first pulse 30 emitted (see FIGS. 3(a) and 3(b)) impinges on first layer 34 of printed matter resulting in particles 40 being removed, but does not have enough energy to completely ablate the ink layers 34 and 38. A second pulse 32, and if necessary subsequent pulses, are emitted from laser source 20 as shown in FIG. 3(c) and the second pulse 32, and/or subsequent pulses, has or have enough energy to complete the ablation of layer 34 and continue through the film 36 substantially unimpeded and ablate layer 38 and remove particles 42 as shown in FIG. 3(d) so as to leave a transparent area through the article 6 which is in register on both surfaces of the film 36, in similar manner to the processes described with respect to FIGS. 1 and 2.

The present invention provides advantages in being able to add a transparent window to printed articles at any time after they have been initially printed, if for example, a design change is required, and it is possible to add markings or transparent windows of variable shape or design, e.g. serial numbers for banknotes, on different or consecutive printed articles easily at high speed and low cost. Furthermore, the provision of front-to-back register on both surfaces of the film after the ablation process has been performed makes printed articles particularly difficult for potential counterfeiters to copy. Application of the ablation process in the above described manner to articles will advantageously pose great problems to potential counterfeiters in that they would have to reproduce intricate windows, numerals, etc., that are in perfect register on both sides of the article.

This invention is particularly applicable for providing windows in banknotes or other security documents requiring a unique serial number or identity number. A window can then represent each digit in the number, and by the use of suitable technology each banknote or security document can have such a unique number. The invention is equally applicable for providing batch codes, dates-of-manufacture, dates-of-issue, signatures or use-by-dates, etc. as required.

It will be appreciated that various modifications may be made to the embodiments described above without departing from the scope or spirit of the present invention.

For purposes of this specification, including the claims, the term comprising shall be taken to have the meaning "including".

What is claimed is:

1. A method of marking an article, the article comprising a substrate with opacifying layers on opposite surfaces of the substrate, said method comprising:
   irradiating an area of the opacifying layer on one surface of the substrate with a single beam of laser radiation such that said area of the opacifying layer on said one surface is ablated by the laser radiation to produce a marking by removing said area of the opacifying layer on said one surface, wherein the single beam of laser radiation travels through the substrate and ablates an area of the opacifying layer on the opposite surface of the substrate to produce a marking by removing the area of the opacifying layer from the opposite surface of the substrate.

2. A method according to claim 1 wherein the opacifying layers on opposite surfaces of the substrate have greater absorption characteristics for laser radiation than the substrate.

3. A method according to claim 2 wherein the wavelength of the laser radiation is selected such that the opacifying layers absorb and are ablated by the radiation and the substrate is substantially unaffected by the laser radiation.

4. A method according to claim 1 wherein the single beam of laser indication is a continuous beam directed at the area of opacifying layer on said one surface of the substrate.

5. A method according to claim 1 wherein the single beam of laser radiation is a pulsed beam which is directed at the area of opacifying layer on said one surface of the substrate.

6. A method according to claim 5 wherein a single pulse of laser radiation is directed at the area of opacifying layer on said one surface of the substrate, said single pulse having sufficient energy to ablate the printed matter on said one surface and then travel through the substrate to ablate the printed matter on the opposite surface of the substrate.

7. A method according to claim 5 wherein a plurality of pulses of the single beam of laser radiation area directed at the area of opacifying layer on said one surface of the substrate.

8. A method according to claim 1 wherein the substrate is formed of a transparent plastics material.

9. A method according to claim 8 wherein the transparent plastics substrate comprises a film of transparent polymeric material.

10. A method according to claim 8 wherein the substrate comprises a laminate of two or more layers of transparent polymeric material.

11. A method according to claim 8 wherein the substrate is formed from any one or more of the following materials: polyethylene (PE); polypropylene (PP) or polyethyltetraphthalate (PET).

12. A method according to claim 1 wherein the opacifying layers on the opposite sides of the substrate comprise printed matter.

13. A method according to claim 12 wherein the opacifying layers of printed matter are formed from opacifying inks.

14. A method according to claim 12 wherein the layers of opacifying ink comprise a pigment dispersed in a binder of cross-linkable polymeric material.

15. A method according to claim 13 wherein the pigment comprises titanium dioxide pigment.

16. A method according to claim 13 wherein the binder comprises a polyurethane based resin.

17. A method according to claim 13 wherein the layers of opacifying ink include silica.

18. A method according to claim 1 wherein the wavelength of the laser radiation falls substantially within the range from 0.5 microns to 20 microns.

19. A method according to claim 18 wherein the wavelength of the laser radiation is approximately 1.06 microns.

20. A method according to claim 18 wherein the wavelength of the laser radiation is approximately 10.6 microns.

21. A method of creating a transparent window in an article comprising a clear substrate with opacifying layers on opposite surface of the substrate, said method comprising:
   irradiating an area of the opacifying layer on one surface of the substrate with a single beam of laser radiation such that said area is ablated by the laser radiation to remove said area of the opacifying layer from said one surface, wherein the single beam of laser radiation travels through the substrate and ablates an area of the opacifying layer on the opposite surface of the substrate to create a transparent window in the substrate.

22. An article comprising a substrate having opacifying layers on opposite surfaces of the substrate, the substrate being formed from a material which is substantially transparent to a single beam of laser radiation of a selected wavelength, wherein each of said surfaces has a marking formed therein, said markings being formed by removing a first area of the opacifying layer on one surface of the substrate by ablating said first area with a single beam of laser radiation of the selected wavelength, and allowing the single beam of laser radiation to pass through the substrate to remove an area of the opacifying layer on the other surface in register with said first area removed from the opacifying layer on said one surface.

23. An article according to claim 22 wherein the opacifying layers on opposite surfaces of the substrate have greater absorption characteristics for laser radiation than the substrate.

24. An article according to claim 22 wherein the substrate is formed of a transparent plastics material.

25. An article according to claim 24 wherein the transparent plastics substrate comprises a film of transparent polymeric material.

26. An article according to claim 24 wherein the substrate comprises a laminate of two or more layers of transparent polymeric material.

27. An article according to claim 22 wherein the opacifying layers on the opposite sides of the substrate comprise printed matter.

28. An article according to claim 22 wherein the article is a security document.

29. An article or security document according to claim 22 wherein the substrate is formed from any one or more of the following materials: polyethylene (PE); polypropylene (PP) or polyethyltetraphthalate (PET).

30. An article according to claim 22 wherein the substrate is substantially transparent to laser radiation having a wavelength falling substantially within the range from 0.5 microns to 20 microns.

31. An article according to claim 22 wherein the substrate is substantially transparent to laser radiation having a wavelength of approximately 1.06 microns.

32. An article according to claim 22 wherein the substrate is substantially transparent to laser radiation having a wavelength of approximately 10.6 microns.

33. A security document comprising a clear substrate formed of a transparent plastics film having opacifying layers of printed matter on opposite surfaces of the film, the substrate being formed from a material which is substantially transparent to a single beam of laser radiation of a selected wavelength wherein both of said surfaces have a marking or a transparent window, said markings or windows being formed in the printed matter by removing a first area of the printed matter on one surface of the substrate by ablating said first area with a single beam of laser radiation of the selected wavelength, and allowing the single beam of laser radiation to pass through the substrate to remove a second area of the printed matter on the other surface, said second area being in register with said first area removed from the printed matter on said one surface.

34. A security document according to claim 33 wherein the opacifying layers of printed matter are formed from opacifying inks.

35. A security document according to claim 34 wherein the layers of opacifying ink comprise a pigment dispersed in a binder of cross-linkable polymeric material.

36. A security document according to claim 35 wherein the pigment comprises titanium dioxide pigment.

37. A security document according to claim 35 wherein the binder comprises a polyurethane based resin.

38. A security document according to claim 35 wherein the layers of opacifying ink include silica.

* * * * *